Patented Feb. 16, 1926.

1,573,595

UNITED STATES PATENT OFFICE.

EDWARD J. WALL, OF WOLLASTON, AND DANIEL F. COMSTOCK, OF BOSTON, MASSACHUSETTS, ASSIGNORS TO KALMUS, COMSTOCK & WESCOTT, OF BOSTON, MASSACHUSETTS, A CORPORATION OF MASSACHUSETTS.

DYE COMPOSITION.

No Drawing. Application filed July 6, 1917, Serial No. 179,050. Renewed September 12, 1923.

*To all whom it may concern:*

Be it known that we, EDWARD J. WALL, a citizen of the United States, and resident of Wollaston, in the State of Massachusetts, and DANIEL F. COMSTOCK, a citizen of the United States, and resident of Boston, in the State of Massachusetts, respectively, have invented new and useful Improvements in Dye Composition, of which the following is a specification.

This invention relates to dye compositions and more particularly to dye solutions for sensitizing photographic substances such as silver emulsions.

Many organic dyes are employed in the photographic art for rendering silver and other emulsions sensitive to light of various colors or hues. Among the more prominent of these dyes may be mentioned, by way of example, the isocyanine group, and such individual dyes as ethyl red (quinaldin-quinolin ethyl cyaniniodid), homocol (mixture of an isocyanine dye with quinolin red, Schultz #610, which is the product of reaction of one mol. benzotrichlorid on a mixture of one mol. quinaldin and one mol. isoquinolin in the presence of zinc chloride), orthochrome T (p-toluquinaldin-p-toluquinolinethylcyanin bromid), pinachrome (p-ethoxyquinaldin-p-methoxyquinolin-ethyl-cyanin bromid), pinachrome violet (1:1'-diethyl-6:6'-aminocarbocyanin halide or the corresponding dimethyl compound), pinacyanol (product of reaction of formaldehyde, followed by alkali, on quinaldinium iodethylate), pinaverdol (p-toluquinaldin quinolinium methyl-cyanin bromid), dicyanine (product of reaction of potash and atmospheric oxygen on alpha-gamma-dimethylquinolinium salts), etc. The usual method of applying these dyes, after the photographic plates or films have been manufactured, comprises bathing the plates or films in an aqueous bath into which has been freshly poured an alcoholic solution of the sensitizing dye or dyes. Small quantities of the dyes diffuse into the film of gelatine or other substance and impart color sensitiveness to the grains of silver emulsion, probably by virtue of the photo-electrical properties of the dyes.

Heretofore it has been possible to utilize only a small fraction of the dye in such a solution owing to the fact that after a brief interval of association with the photographic substance and before more than a few per cent of the dye content is exhausted the dye coagulates and precipitates out of the bath. And owing to the excessive cost of these dyes and the great difficulty of obtaining them some satisfactory method of prolonging the useful life of the aqueous bath has been greatly desired but, up to the present time, appears to have remained undiscovered.

This premature precipitation of the dye is particularly objectionable where, as is usually the condition, the solution contains a plurality of sensitizing elements mixed in definite proportions to produce a certain color sensitiveness in the photographic emulsion, for under such circumstances the several dyes are precipitated at different rates and the correct proportions of the suspended components of the dyes therefore cannot be maintained. Moreover the precipitated residue, even if recovered in dry form, cannot be used over again by being redissolved in alcohol without first being carefully analyzed to determine the proportions of the several dyes. Another reason why bathing solutions have heretofore given great difficulty is that a progressive change appears to go on in the dye solution even before noticeable precipitation begins and it is not possible therefore to repeat the sensitizing process with similar results after the lapse of even so short a time as ten minutes. It is therefore practically hopeless to standardize the sensitizing process with the solutions now known.

The principal object of the present invention is to overcome the above mentioned difficulties and to prolong the useful life of dye solutions by restraining the coagulation and precipitation of the dye from the solution.

This and other objects we have attained by the discovery that the desired restraining action may be effected by adding to the dye solution minute amounts of certain ingredients among which, by way of example, may be enumerated the following: gelatine, albumen, water-glass, dextrin, sugar, starch, casein, glycerine, etc. For example, we have found that on hundredth of one per cent of gelatine added to the aqueous solution will prolong the life of the bath from ten to thirty times.

It will be noticed that most of the substances mentioned in the preceding paragraph, are of the class of substances known as emulsoids, and indeed we have found that any emulsoid will function in the aforesaid manner to a more or less satisfactory extent, it being understood that the term emulsoid is here employed in its usual scientific sense which may be generally described as follows: Systems consisting of solid particles of microscopic or sub-microscopic size distributed through a liquid are known as suspensions, while those having two liquid phases are known as emulsions; consequently solutions resembling the former are called suspensoids, and the solutions which resemble the latter, particularly in showing markedly high viscosities and in forming gelatinous masses on drying, are called emulsoids.

The restraining action resulting from the admixture of the gelatine or other emulsoid we believe to be due to the following theoretical considerations: The dye substances above enumerated are soluble in alcohol but are insoluble in water; consequently when the alcoholic dye solution is poured into the water a colliodal solution results. This colloidal solution is of the class known as suspensoids and the microscopic particles have a strong tendency to coalesce and precipitate under certain conditions as, for example, when an electrolyte is added to the solution. This is probably due to the fact that a given type of microscopic particles are all electrically charged in like manner, for example negatively, whereas the ions of the electrolyte are oppositely charged, that is positively. The like charges of the negative particles cause the particles to repel each other and thereby maintain themselves distributed throughout the solution substantially uniformly instead of massing together and settling to the bottom of the container. Upon the addition of an electrolyte the electric charges of the colloidal particles in the solution are at least in part neutralized by the oppositely charged ions of the electrolyte and, as they no longer repel but may even attract one another, they are free to approach each other and to form larger aggregates, which settle more or less rapidly.

Photographic emulsions contain certain soluble constituents and impurities which rapidly dissolve when the plates or films are bathed in the dye solutions and these impurities have the same effect upon the dye solutions as electrolytes.

The restraining action of the gelatine or other emusloid may be explained by the assumption that each particle of the suspensoidal dye surrounds itself with a layer of the emulsoid and then possesses the electrical properties of the latter.

It is to be understood that the above theoretical explanation is given merely for the purpose of more fully and completely disclosing the nature of the invention and is not to be construed as limiting the scope of the invention in any way whatsoever.

We claim:

1. A composition for treating photographic emulsions comprising a colloidal color sensitizing solution, and a dye protector for restraining the coagulation of the colloidal dye.

2. A composition for treating photographic emulsions comprising a colloidal color sensitizing solution, and a colloidal substance for restraining the coagulation of the colloidal dye.

3. A composition for treating photographic emulsions comprising a suspensoidal color sensitizing dye and an emulsoidal dye protector.

4. A composition for treating photographic emulsions comprising a suspensoidal color sensitizing dye, and an emulsoidal element in amount of the order of a small fraction of one per cent for restraining the coagulation of the suspensoidal dye upon association with the photographic emulsion.

5. A composition for treating photographic emulsions comprising a colloidal color sensitizing dye solution, and an amount of gelatine of the order of a small fraction of one per cent for restraining the coagulation of the colloid.

6. A color-sensitizing photographic dye composition comprising an isocyanine dye solution, and a dye protector for restraining the precipitation of the dye.

7. A color-sensitizing photographic dye composition comprising a suspensoidal isocyanine dye, and an emulsoidal dye protector for restraining the precipitation of the solid particles of the suspensoidal dye.

8. A composition for treating photographic emulsions comprising a colloidal ingredient adapted to affect the emulsion and a protective ingredient adapted to restrain the coagulation of the colloidal ingredient.

9. A composition for treating photographic emulsions comprising a suspensoid adapted to alter the condition of the emulsion and a protector adapted to prevent the coagulation of the suspensoid, whereby the suspensoid may be applied to emulsions for a long period without coagulating appreciably.

10. A composition for sensitizing photographic emulsions comprising a suspensoidal sensitizer and a protective ingredient adapted to prevent the coagulation of the suspensoidal sensitizer in the presence of photographic emulsions for a long period of time.

11. A composition for sensitizing photographic emulsions comprising a colloidal sensitizer and a protective ingredient for restraining the coagulation of the colloidal sensitizer in the presence of the photographic emulsion, the protective ingredient constituting less than one per cent of the composition.

12. A composition for treating photographic emulsions comprising a color-sensitizing dye, and gelatine.

13. A composition for treating photographic emulsions comprising a color-sensitizing dye solution and an ingredient for restraining the precipitation of the dye.

14. A composition for treating photographic emulsions comprising an ingredient adapted to affect the sensitivity of the emulsion and an ingredient adapted to control the precipitation of the first ingredient.

Signed by us at Boston, Massachusetts, this second day of July, 1917.

DANIEL F. COMSTOCK.
E. J. WALL.